United States Patent Office 2,750,680
Patented June 19, 1956

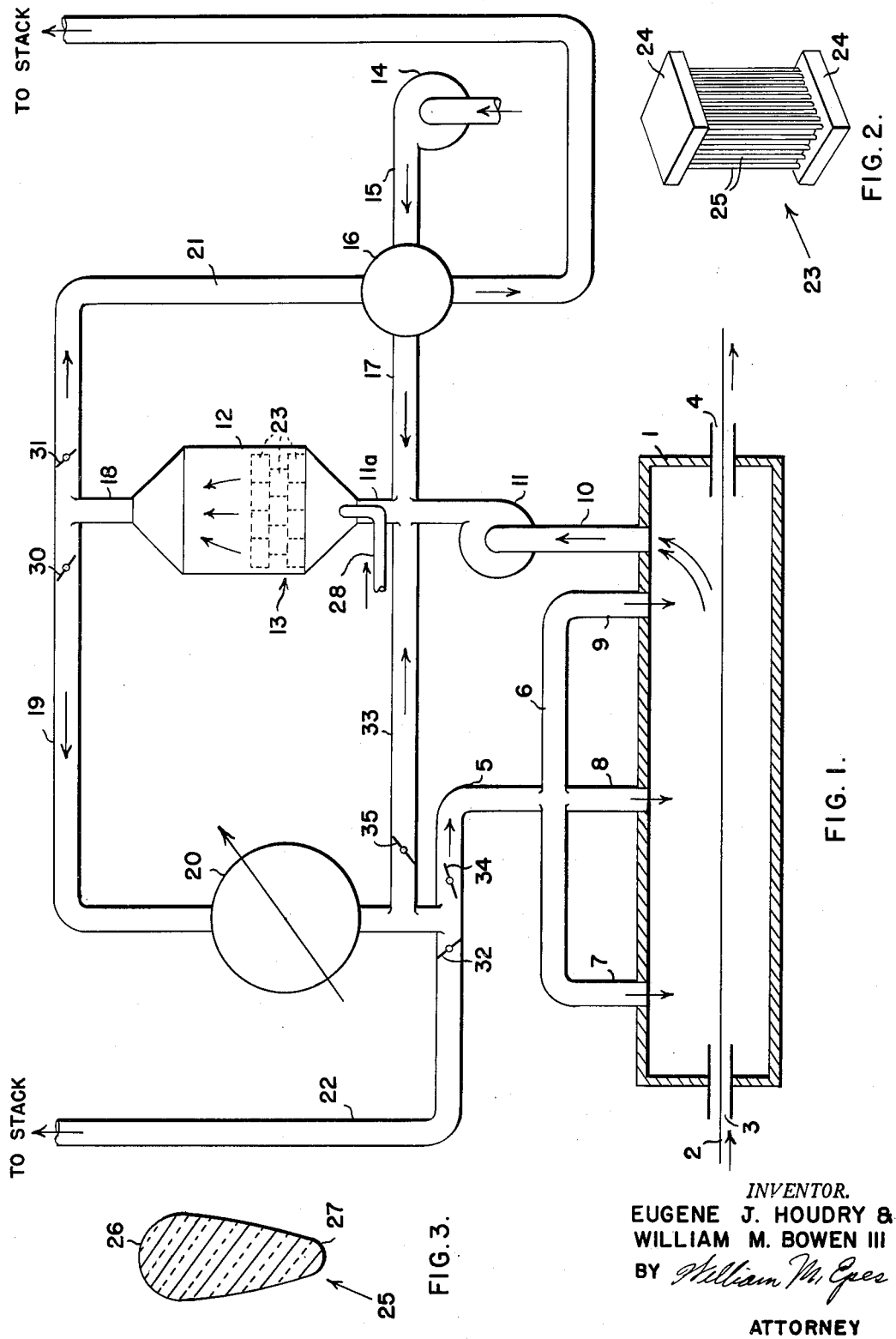

2,750,680

METHOD FOR TREATING MATERIALS

Eugene J. Houdry, Ardmore, and William M. Bowen III, Chester, Pa., assignors to Oxy-Catalyst, Inc., a corporation of Pennsylvania Application August 2, 1952, Serial No. 302,386

7 Claims. (Cl. 34—35)

This invention is concerned with an improved method for drying, baking, roasting, or otherwise treating oxidizable materials with a stream of heated gases during the course of which treatment oxidizable fumes are given off into the gas stream. The invention is for example concerned with roasting coffee, drying fish or fish meal, roasting or drying tobacco, roasting meats and poultry and other similar operations in which oxidizable fumes in the form of organic vapors and extremely finely divided mists and smokes are given off into the gas stream as it flows in contact with the material undergoing treatment. The invention is particularly concerned with an improved method for drying articles which give off a substantial amount of fumes in the form of combustible solvent vapors during the drying operation so as to create serious problems of fire and explosion, as in the drying of wire, metal strips, or other objects coated with paints, enamels, japans, lacquers, etc. containing volatile combustible solvents, or as in the drying of printing inks dispersed in a volatile combustible vehicle.

In such treating operations it has long been considered desirable that substantially inert gases be employed so as to provide a substantially non-oxidizing atmosphere in the treating zone and elsewhere in the system. The use of inert gases provides a number of important advantages such as the elimination of the danger of fires and explosions and the elimination of oxidation of the material being treated. However, because of the prohibitively high cost of generating inert gas by conventional methods, and the impossibility of continually recirculating the inert gas stream through the treating zone due to the build-up of fumes given off by the material being treated (these fumes are difficult to destroy since in most cases they are present in relatively low concentrations) the use of inert gases for this purpose has been heretofore considered impractical. According to the present invention a method is provided which makes the use of substantially inert gases for such treating operations entirely practical and economically feasible, and makes possible the elimination of the disadvantages connected with the use of heated air which is usually employed in conventional processes of this type.

Stated in general terms, the invention involves the steps of passing heated gases through the treating zone in direct contact with the material being treated, passing the effluent from the treating zone, containing the oxidizable fumes given off therein, to a catalytic oxidation zone and therein contacting this mixture with an oxidation catalyst under conditions permitting substantially complete oxidation of these fumes and other oxidizable material in the gas stream, and then recirculating a portion of this substantially fume-free gas to the treating zone, while limiting the amount of oxygen-containing gas introduced into the system such that the stream of heated gases will not support combustion under the conditions of operation. The use of an oxidation catalyst in this manner permits combustible material in the effluent from the drying, roasting, or other treating zone to be oxidized substantially completely to inert gases although the effluent itself is completely outside flammability limits because of the low concentration of oxygen in the system and the low concentration of combustibles to be oxidized. Only enough air or other oxygen containing gas is introduced to furnish the stoichiometric quantity (or only a slight excess) of the oxygen which is required to combine with the combustibles present in the effluent gas from the treating zone and with other combustibles which may be introduced. After treatment of the effluent in the catalytic oxidation zone, it is returned to the treating zone free from vapors or fumes and containing very little or no oxygen, such that it is substantially inert under operating conditions and will not support combustion. Generally, it is contemplated that the atmosphere in the treating zone contain no more than about 5% of free oxygen, and preferably no more than about 3%.

When substantial amounts of combustible vapors are evolved, such as in the drying of enamels and lacquers containing volatile solvents, the catalytic oxidation of the evolved vapors may be sufficient, or more than sufficient, to provide all the heat necessary for the drying operation. In other cases, such as in the roasting of coffee, or in the drying of fish, the amount of combustible fumes given off may be relatively small such that it is necessary to supply heat to the system from an extraneous source in a manner such as not to introduce excess oxygen into the system.

The invention will be illustrated in the following description particularly by its application to the drying of articles coated with enamels, lacquers, etc. which give off such large quantities of combustible vapors during the drying operation that there is an ever-present danger of fire or explosion. According to present practices, one of the most common methods for guarding against these dangers is to employ such a large volume of air for drying that the mixture of air and combustible vapor formed in the drying oven is so dilute in vapor as to be outside the limits of flammability. Usually, the concentration of combustible vapor is held to about one-half, or even to about one-quarter, of the lower limit of flammability of the vapor-air mixture under operating conditions.

While this method of operation is ordinarily effective in eliminating the hazard of fire or explosion, it has a number of serious disadvantages. First of all, large volumes of heated air are required to dilute the vapors evolved. These leave the oven at a relatively low temperature and are usually vented to the atmosphere as is, since the temperature level of the oven exhaust gases is too low for efficient heat recovery. This results, of course, in the consumption of large amounts of heat. A second disadvantage of this type of process is that even using large amounts of diluting air, there is always the danger that concentrations of combustible vapor will build up in localized, relatively stagnant areas in the oven, so that in certain parts of the oven mixtures are produced which are within the limits of flammability, or that, through some malfunctioning of the circulation system, an insufficient amount of diluting air reaches the oven so that the entire oven atmosphere rapidly becomes explosive. This type of process is furthermore often disadvantageous in that the drying oven atmosphere contains a large amount of oxygen which often serves to limit drying temperatures so as to avoid oxidation of the material being dried, and thus serves to limit the oven capacity, since this depends to a great extent upon the drying temperature. Finally, since the mixture of air and combustible vapors exhausted from the oven is below the limits of flammability, this exhaust is usually vented to the atmosphere unchanged, thus entirely wasting the heat content of these vapors and, in addition, often creating serious problems of air pollution due to the unpleasant and often noxious character of these fumes.

The disadvantages and difficulties discussed above are eliminated entirely by the present invention which combines features which have heretofore been considered unattainable in a drying operation in which combustible vapors are evolved. As applied to this type of drying operation, the invention involves the catalytic oxidation of the combustible vapors produced during drying in the presence of a controlled amount of oxygen so as to produce a drying gas in which the oxygen content is such that the mixture of combustible vapor and drying gas formed in the drying zone is always outside the limits of flammability under operating conditions, irrespective of the vapor concentration in the mixture. In a great many cases, the amount of combustible vapor evolved during the drying operation will be more than sufficient to provide all the heat required for drying when it is subjected to catalytic oxidation in accordance with the invention. In fact, in some cases, it may be necessary to extract heat from the system to provide a drying gas of the proper temperature. In other cases, when the combustible vapors are not evolved in sufficient quantity to provide all the heat required during the drying operation, it will be necessary to supply heat to the system from an extraneous source.

Because of the low oxygen content of the drying gas provided by operation in accordance with the invention, it is impossible to accidentally build up the vapor concentration in the drying oven to within explosive limits as in prior methods which use air as the drying gas. Thus, stagnant areas in the oven, or accidental failure of the circulation system cease to be as hazardous as in prior drying methods. According to a preferred, and very advantageous embodiment of the invention, not only is the oxygen content of the drying gas reduced to a low value, but the evolved vapors are also kept diluted in a large volume of inert drying gases such that it is impossible to convert the oven atmosphere into an inflammable mixture at operating temperatures. As will be explained in more detail subsequently, this makes it practically impossible to produce combustible mixtures during the drying operation, accidentally or otherwise, and thus insures great safety of operation.

The low oxygen content of the drying gas permits in most cases a higher drying temperature without danger of oxidation, and thereby makes possible higher oven capacity and furthermore insures a higher quality product free from oxidative deterioration. A further advantage of this application of the invention is that all, or usually at least the major portion of the heated drying gases are supplied by catalytic oxidation, which produces a clean, soot-free gas, and consequently contamination of the articles which are dried by suspended smoke or soot, and the accumulation of soot deposits in the drying ducts, is eliminated. Furthermore, and of great importance because of the substantially complete combustion of the solvent vapors, the gases vented to the atmosphere are substantially free from unpleasant odors.

For a more detailed explanation of the invention reference is now made to the accompanying drawings, in which, Fig. 1 is a semi-diagrammatic illustration of a typical embodiment of the invention as applied to the drying of lacquers, enamels, etc.; and, Fig. 2 is a perspective view of a catalytic unit which is particularly suited for use in the process of the invention; and, Fig. 3 is a cross sectional view of one of the elements making up the catalytic unit illustrated in Fig. 2.

Referring now to Fig. 1, reference numeral 1 indicates a drying oven. A metal strip 2 coated with an enamel, lacquer or the like, by means not shown is moved through the oven in a continuous manner, entering by port 3 and leaving by port 4. The entrance and exist ports may be slotted as shown to control the amount of exterior atmosphere entering the oven. It may prove desirable to permit some of the relatively cool exterior air to flow through the entrance port 3 to prevent the immediate and to rapid flash-off of solvent when the coated strip enters the oven. If desired, however, suitable gas seals may be provided to completely segregate the interior of the oven from the external atmosphere.

A hot drying gas, provided in a manner to be subsequently explained is introduced into the drying oven through line 5, header 6, and lines 7, 8 and 9. The hot gas contacts the metal strip 2, causing evaporation of the solvent or combustible vehicle contained in the coating carried thereby. The mixture of drying gases and combustible vapors evolved in the drying oven is exhausted therefrom through line 10 by blower 11 and introduced into catalytic oxidation chamber 12 containing the oxidation catalyst indicated generally by the reference numeral 13, and made up of units 23.

Before flowing into the oxidation chamber the mixture of drying gas and combustible vapor is mixed with a controlled quantity of air delivered into line 11a by blower 14 through line 15, preheater 16 and line 17. In the presence of oxidation catalyst 13 and the proper amount of air introduced through line 17, the combustible vapors in the mixture flowing into the oxidation chamber 12 undergo substantially complete oxidation, producing inert gases consisting largely of $CO_2$ and $H_2O$ and thus raising the temperature of the gas mixture. Heated, substantially vapor-free gas flows from the oxidation chamber 12 by line 18.

A portion of this gas is recycled to the drying oven 1 by line 19, heat exchange 20 (if necessary), line 5, header 6 and lines 7, 8 and 9. Another portion of the drying gases (usually a minor portion) is vented from the system either by line 21 or by line 22 depending upon the desired method of operation.

The amount of air or other oxygen-containing gas entering the system through line 17 or entering elsewhere in the system is so adjusted as to provide at least the stoichiometric quantity of oxygen required for complete oxidation of the solvent vapors passing through line 11a into the oxidation chamber. However, the amount of oxygen entering the system is limited such that, when the gases leaving oxidation chamber 12 are recycled to the drying oven 1 as drying gas, the mixture of drying gas and combustible vapors formed in the oven will always remain outside the limits of flammability irrespective of the vapor concentration therein.

It is, of course, well known that each type of combustible vapor or mixture of combustible vapors has its own upper and lower limits of flammability in air. In gases having an oxygen content lower than air, these flammability limits are narrower. As the oxygen content of air is reduced, for example by replacement of the oxygen content with inert combustion gases, the limits of flammability of a mixture of combustible gases or vapors with the resulting oxygen-deficient gas steadily become narrower as the oxygen content decreases, until at a certain oxygen content it is impossible to form a flammable mixture irrespective of the concentration of combustibles. Thus, for example, if the oxygen content of air is gradually replaced by nitrogen, when the oxygen concentration is reduced to about 12%, it is no longer possible to form a flammable mixture containing methane and the oxygen deficient gas irrespective of the methane concentration. (See U. S. Bureau of Mines Bulletin 279 "Limits of Inflammability of Gases and Vapors (1939).) Since the limits of flammability depend upon the chemical composition of the combustible vapors, and operating conditions such as temperature and pressure, it is clear that it is not possible to specify a numerical value for the maximum oxygen content that can be tolerated which will be valid for all systems. However, for any particular system this value can be obtained by experiment. It is, of course, wise to operate in a range safely under the maximum upper limit. In the majority of cases, it is contemplated that the drying gases introduced into the oven should contain no more than about 5% of free oxygen.

According to a particularly preferred embodiment of the invention, the combustible vapors are diluted in a large volume of the low oxygen content drying gases such that the mixture of combustible vapors and drying gases from the oven (which in itself is outside flammability limits because of low oxygen content) cannot be converted into an inflammable or explosive mixture by the accidental admixture of the oven atmosphere with air, for example. Dilution of the evolved vapors can be accomplished by recirculating a relatively large volume of the inert vapor-free effluent gases from oxidation chamber 12 to the drying oven. According to this preferred embodiment, the atmosphere in the drying oven is rendered non-flammable in two ways. First, by reason of low oxygen concentration in the drying gas, and secondly, by reason of a low concentration of combustible vapors therein. This provides a double protection against the possibility of fires and explosions, and provides safety of operation even in the event of the malfunctioning of a portion of the system.

Any suitable oxidation catalyst may be employed which is capable of promoting the oxidation of mixtures which are outside the limits of flammability either because of a low oxygen concentration, a low concentration of combustibles, or both. Well known oxidation catalysts containing copper, chromium, vanadium, manganese, molybdenum, silver, nickel, cobalt, iron, magnesium, platinum, palladium, ruthenium or combinations of these metals may be employed for example. Catalysts of particularly high activity may be prepared by dipping catalytically active alumina in solutions of the salts of the metals listed above, followed by thermal or chemical decomposition of the metal salts. Catalytically active magnesia, berylia or thoria may, if desired, be substituted for the alumina.

Preferably, the catalyst is supported in such a manner that the pressure drop through the catalyst is held to a minimum. A suitable catalytic unit for accomplishing this purpose is illustrated in Fig. 2 of the drawings. As may be seen, the unit consists of a pair of end plates 24 which are provided with a plurality of apertures for receiving a plurality of elongated elements or rods 25 in such manner that these elements are supported between end plates 24 in spaced apart relation, preferably in staggered rows. To prevent breakage due to expansion while in use, rods 25 are supported freely at least at one end so as to permit longitudinal expansion. End plates 24 are fastened together by a single central post which, in the view shown, is surrounded by elements 25 and thus cannot be seen. To provide a minimum pressure drop through the catalytic unit, the elements 25 are preferably streamlined in contour. Fig. 3 shows a cross-section of one of these elements showing such a contour. The leading edge 26 of the element with respect to the direction of gas flow through the unit is rounded as shown, while the trailing edge 27 is tapered, thus minimizing turbulence.

The catalytic unit is preferably composed of high quality porcelain, with the catalyst disposed on the surface thereof in a thin, tightly adherent film. Thus, each of the rodlike elements 25 may be provided with a thin adherent coat of catalytically active alumina to which platinum is added by dipping in a solution of the metal salt with subsequent decomposition of the salt thermally or chemically. Such a unit provides a highly suitable catalyst for use in the invention. The catalyst bed 13 may be made up of a number of the units 23, stacked one upon the other in rows and in layers.

Depending upon the activity of the particular catalyst employed, there will be a certain minimum operating temperature required before the catalyst will begin to function. With certain types of platinum-on-alumina catalysts, for example, normally a minimum temperature of about 500° F. is necessary. In order to bring the catalyst up to operating temperature at the beginning of the operation it is desirable to provide a gas burner, such as the burner 28 in the lower part of the catalytic combustion chamber. This burner may be operated only at the beginning and turned off after the concentration of combustible vapor reaches a level sufficient to maintain the catalyst bed at the required temperature. Continuous operation of the burner 28 may be necessary if the amount of combustible vapor evolved is insufficient to maintain the required bed temperature.

Depending upon the particular catalyst there is also a maximum operating temperature above which the catalyst permanently loses its activity. With a platinum-alumina catalyst supported upon porcelain in the manner described, for example, the maximum safe operating temperature is of the order of 2100° F. To keep below the maximum permissible operating temperature, the concentration of vapor in the gas-vapor mixture entering the catalytic combustion chamber, and the temperature of this mixture, must be so controlled that the temperature increase occurring during catalytic combustion will not result in a final temperature above the maximum permissible operating temperature. Vapor concentration in the mixture entering the catalyst chamber can be readily controlled by recirculating large volumes of gas from the catalyst chamber to the oven, and back to the catalyst chamber. The vapor concentration is of course reduced practically to zero when the gas-vapor mixture passes through the catalyst. The temperature of the recirculated gases can be readily controlled by means of a heat exchanger 20. Cooling of the recirculated gases may be necessary when large quantities of combustible vapor are evolved.

The proper heat balance in the process may be maintained in a variety of ways. When the vapor evolved during the drying operation is in excess of that which is required to provide the necessary heat for drying, it is, of course, clear that heat must be extracted from the system. This may be done, for example, by the use of a cooler, or waste heat boiler 20 located in line 19 for returning the hot gases from the catalyst to the oven. The effluent from the catalyst may, for example, be at a temperature of 1600° F., while the required oven temperature may be 500° F. In waste heat boiler 20, therefore, the gas temperature is reduced from 1600° F. to 500° F., providing valuable, high temperature steam.

When the amount of combustible vapor evolved during the drying operation is insufficient to provide all the heat required in the process, heat must be added in some way to supplement the heat produced by the evolved vapors. This may be accomplished in a variety of ways. One particularly convenient method is to add a gaseous fuel to the system in an amount sufficient to complement the heat furnished by evolved vapors in making up the total heat requirements of the process. This supplemental fuel may, for example, be added through burner pipe 28 (with the burner air supply shut off) so as to mingle with the gases passing through the catalyst chamber and undergo catalytic oxidation along with the evolved vapors. Alternatively, or in addition, heat may be added to the system by burning a fuel non-catalytically and introducing the hot combustion products directly into the system. Thus, a mixture of air and fuel may be supplied to the burner 28 in the proper proportions, the resulting hot products of combustion serving both to maintain the catalyst bed at operating temperature and provide the required additional heat in the system.

It will be noted that two alternative methods are illustrated for venting the excess gases from the system. According to one method, the excess gas is conducted by line 21, through air preheater 16, and finally to stack. In some cases it may not be desired to use air preheat, and in such a case, the entire effluent may be passed through line 19 and heat recovery unit 20 before venting the excess to stack by line 22. Valves 30, 31 and 32 may be employed to control the flow in these lines.

While, as previously explained, it is preferable from a safety viewpoint, to dilute the evolved vapors with a large volume of inert drying gases such that it is impossible to convert the oven atmosphere into an inflammable mixture, it may sometimes be desirable to maintain a relatively large vapor concentration in the drying zone. This may be desirable, for example, when it is desired to slow down evaporation of the solvent from the material being dried. In such cases, a relatively small portion of the gases recirculated from catalytic oxidation chamber 12 are returned to the drying oven by line 5. This permits the vapor concentration in the oven atmosphere to increase, and consequently the mixture withdrawn from the oven by line 10 contains a relatively high concentration of combustible vapor. In such a case it will usually be necessary to dilute the oven effluent with relatively cool inert gases before passing into the catalytic oxidation chamber to prevent too high a temperature rise when the mixture is passed in contact with the oxidation catalyst. Dilution of the oven effluent may be accomplished very advantageously by splitting the stream of recirculated gases from oxidation chamber 12, after cooling in waste heat boiler or cooler 20 if necessary, and then sending a portion of this stream through the oven by line 5 and sending another portion through line 33 to be mixed with oven effluent prior to introduction thereof into the oxidation chamber 12. Dampers 34 and 35 may be employed to control the flow of gas in lines 5 and 33 respectively. The presence of a relatively high concentration of combustible vapor in the drying oven is made safe and feasible by operation in accordance with the invention since the oxygen content of the drying gases is limited such that the oven atmosphere is outside the limits of flammability irrespective of vapor concentration therein.

*Example*

The following example illustrates the application of the invention to a process for drying lithographed metal sheets coated with a lacquer dissolved in a volatile combustible solvent. In the particular installation involved, the total heat load amounting to 946,500 B. t. u./hr. including the heat necessary for solvent evaporation, heating of lacquer pigment, system heat losses, and the heat necessary to heat the metal plates themselves and the conveying equipment at an average oven temperature of 400° F. and an oven exhaust temperature of 300° F. Solvent evaporation is at the rate of .325 gallons per minute. Heat available from this solvent after complete combustion amounts to 2,340,000 B. t. u./hr., or more than twice the amount necessary to supply all the heat requirements of the drying operation.

Operating in accordance with the invention, sufficient air is added to the system to supply the stoichiometric amount of oxygen for complete combustion of the solvent vapors, and in this particular case, an amount of excess air to supply a 2% excess of oxygen, amounting in all to 466 s. c. f. m. (standard cubic feet per minute) of air. Catalytic units similar to that illustrated in Fig. 2 are employed. Elements 25 are composed of porcelain and are coated with a thin, tightly adherent film of catalytically active alumina impregnated with platinum. With this type of catalyst approximately 55,000 square inches of catalyst surface area are required when operating according to the flow conditions set out below.

In order to reduce the temperature rise through the catalyst, the effluent from the catalyst is recirculated at a rate sufficient to provide a total of 1780 s. c. f. m. of total gas through the catalyst, at a catalyst entering temperature of 300° F., thereby providing a 1200° F. temperature rise across the catalyst, or a final temperature of 1500° F. for the gases leaving the catalyst. The major portion (1314 s. c. f. m.) of these 1500° F. gases are recirculated to the oven after cooling to a temperature of 450° F. in a waste heat boiler, while a minor portion (approximately 466 s. c. f. m.) after cooling, are vented to the atmosphere. The waste heat boiler in this manner produces about 34 pounds per minute of 150 pounds per square inch steam.

The foregoing example illustrates the preferred embodiment of the invention in that not only is the oxygen concentration reduced to such a low level in the drying oven (2 per cent) that a substantially inert atmosphere exists therein, but in addition, the concentration of the solvent vapor in the drying gas (0.4%) is reduced to such a low value that the occurrence of fire or explosion is rendered doubly impossible.

In contrast to the foregoing method of operation, according to conventional drying methods, 3200 s. c. f. m. of air entering the oven at a temperature of 450° F. would be required to dilute the solvent vapors safely below flammability limits in air, and this entire volume of air plus vapors would be exhausted to the atmosphere, at a temperature of 300° F., thereby requiring the expenditure of 1,332,000 B. t. u./hr. of extraneously supplied heat, and in addition, creating a serious problem of air pollution due to the venting of the unburned solvent fumes.

The method of the invention permits the efficient utilization of substantially the entire potential heat content of the combustible vapors evolved during the drying operation. This makes it possible in some cases such as in the drying of enamels, lacquers, etc. to supply all the heat necessary for drying by catalytic oxidation of these vapors and even sometimes to provide a large quantity of additional heat which may be easily and efficiently recovered. To provide the drying gas, only a small amount of air is added to the system, namely an amount equal to, or slightly in excess of that required to provide the stoichiometric quantity of oxygen for complete combustion of the vapors evolved, and (when it is required) for combustion of extraneous gaseous fuel added to the system to supplement the heat provided by these vapors. With this method of operation the volume of gases which must be exhausted from the system is reduced to a minimum (amounting only to the small volume of air introduced). This makes possible highly efficient utilization of the heat released in or introduced into the system, and efficient recovery of excess heat released in the system.

In the foregoing description the invention is described chiefly in reference to the drying of enamels and lacquers and the like where the danger of fire and explosion is present. It is evident that in this particular application the invention has particularly unique advantages.

Other operations to which the invention may be applied are, as mentioned previously, coffee roasting, the drying of fish, or of fish and animal wastes, the roasting of meats and poultry and the like. Applied to these types of processes the invention provides a stream of substantially inert treating gases which cannot support combustion, thereby eliminating any possibility of burning the material being treated and eliminating or greatly reducing oxidative deterioration of the materials being treated. Because of the inert atmosphere, often higher treating temperatures can be employed, thereby increasing capacity of the treating unit. When the effluent from the treating zone is passed through the oxidation catalyst, fumes evolved in the treating zone are destroyed, while at the same time other combustible substances in the gas stream likewise tend to be oxidized to harmless inert gases. This provides a clean substantially soot-free gas for recirculation to the treating zone. The destruction of the fumes from the treating zone likewise eliminates problems of air pollution resulting from the venting of these fumes to the atmosphere as is the usual practice in conventional methods. Thus, in coffee roasting, fish drying, etc. the malodorous, obnoxious fumes produced are completely destroyed, and in addition their heat content is advantageously utilized. In the roasting of meats and poultry the grease vapors which ordinarily deposit in the baking oven and on articles in surrounding areas, are likewise eliminated.

In these, and other similar types of applications, the amount of combustible fumes evolved are usually insufficient to furnish the heat necessary for the treating operation. Consequently heat must be supplied to the system. This heat is most advantageously supplied immediately in advance of the catalyst so that the catalyst may be kept at a sufficiently high temperature to insure high oxidation activity. As previously described this additional heat may be introduced in one of several ways, such as by placing a burner, such as burner 28 in Fig. 1, immediately in advance of the oxidation catalyst to burn a suitable fuel non-catalytically and thus produce heat. If the burner does not provide completely efficient combustion, the oxidation catalyst will complete the oxidation of the fuel catalytically. Alternatively, a gaseous fuel may be mixed with the gases about to enter the catalytic oxidation chamber together with the stoichiometric quantity, or slight excess, of the oxygen required for complete oxidation thereof. Still another suitable method for adding the necessary heat is to install an electric heating element in the gas stream immediately in advance of the oxidation chamber. In any case, the introduction of the required heat into the effluent from the treating zone just before it enters the catalytic oxidation zone assures that the oxidation catalyst will be maintained at the operating temperature required for efficient oxidation of relatively small traces of oxidizable materials.

It is to be understood that the foregoing description and examples are intended to be illustrative of the invention, and that the invention is not to be limited thereto, nor in any way except by the scope of the appended claims.

We claim:

1. A method for drying articles which give off substantial quantities of combustible vapors during the drying operation, said method involving the use of a substantially inert drying gas which is continuously generated by the oxidation of vapors evolved in the course of the drying operation and comprising the steps of passing heated drying gas through a drying zone in contact with the articles to be dried, passing said drying gas containing evolved combustible vapors and at least sufficient oxygen to provide for complete oxidation of said vapors to a catalytic oxidation zone and therein contacting said mixture with an oxidation catalyst under conditions permitting substantially complete oxidation of said vapors, recycling heated, substantially vapor-free gas leaving said catalytic oxidation zone to said drying zone as drying gas, while limiting the overall addition of oxygen to the system such that the substantially vapor-free gas from the catalytic oxidation zone is so deficient in oxygen that the gas-vapor mixture formed therewith in said drying zone always remains outside the limits of flammability under operating conditions irrespective of the vapor concentration in said mixture.

2. A method for drying articles which give off substantial quantities of combustible vapors during the drying operation, said method involving the use of a substantially inert drying gas which is continuously generated by the oxidation of vapors evolved in the course of the drying operation and comprising the steps of passing heated drying gas through a drying zone in contact with the articles to be dried, passing said drying gas containing evolved combustible vapors and at least sufficient oxygen to provide for complete oxidation of said vapors to a catalytic oxidation zone and therein contacting said mixture with an oxidation catalyst under conditions permitting substantially complete oxidation of said vapors, recycling heated, substantially vapor-free gas leaving said catalytic oxidation zone to said drying zone as drying gas, while limiting the overall addition of oxygen to the system such that the substantially vapor-free gas from the catalytic oxidation zone is so deficient in oxygen that the gas-vapor mixture formed therewith in said drying zone always remains outside the limits of flammability under operating conditions irrespective of the vapor concentration in said mixture, and at the same time limiting the concentration of combustible vapor in said drying gas so that it is impossible to convert the atmosphere of said drying zone into an inflammable mixture by mixing air therewith.

3. A method for drying articles involving the use of a substantially inert drying gas which is continuously generated by the oxidation of vapors evolved in the course of the drying operation and in which the amount of vapors evolved is such that the heat generated by the oxidation thereof is more than sufficient to furnish all the heat necessary for the drying operation, said method comprising the steps of passing a heated drying gas through a drying zone in contact with the articles to be dried, passing said drying gas containing evolved combustible vapors and at least sufficient oxygen to provide for complete oxidation of said vapors to a catalytic oxidation zone and therein contacting said mixture with an oxidation catalyst under conditions permitting substantially complete oxidation of said vapors, recycling heated, substantially vapor-free gas leaving said catalytic oxidation zone to said drying zone as drying gas, extracting heat from the system in excess of that necessary to maintain the temperature of said drying zone at the required level, while limiting the overall addition of oxygen to the system such that the substantially vapor-free gas from the catalytic oxidation zone is so deficient in oxygen that the gas-vapor mixture formed therewith in said drying zone always remains outside the limits of flammability under operating conditions irrespective of the vapor concentration in said mixture.

4. A method for drying articles involving the use of a substantially inert drying gas which is continuously generated by the oxidation of vapors evolved in the course of the drying operation and in which the amount of the vapors evolved is sufficient to furnish a substantial portion, but not all, of the heat required for the drying operation, said method comprising the steps of passing a heated drying gas through a drying zone in contact with the articles to be dried, passing said drying gas containing evolved combustible vapors and at least sufficient oxygen to provide for complete oxidation of said vapors to a catalytic oxidation zone and therein contacting said mixture with an oxidation catalyst under conditions permitting substantially complete oxidation of said vapors, recycling heated, substantially vapor-free gas leaving said catalytic oxidation zone to said drying zone as drying gas, adding heat to the system to supplement the heat provided by oxidation of said vapors to maintain a predetermined required temperature in said drying zone, while limiting the addition of oxygen to the system such that the substantially vapor-free gas from the catalytic oxidation zone is so deficient in oxygen that the gas-vapor mixture formed therewith in said drying zone always remains outside the limits of flammability under operating conditions irrespective of the vapor concentration in said mixture.

5. A method for drying articles which give off substantial quantities of combustible vapors during the drying operation, said method involving the use of a substantially inert drying gas which is continuously generated by the oxidation of vapors evolved in the course of the drying operation, and comprising the steps of passing a heated drying gas through a drying zone in contact with the articles to be dried, passing said drying gas containing evolved combustible vapors and at least sufficient oxygen to provide for complete oxidation of said vapors to a catalytic oxidation zone and therein contacting said mixture with an oxidation catalyst to effect substantially complete oxidation of said vapors, recycling heated substantially vapor-free gas leaving said catalytic oxidation zone to said drying zone as drying gas, controlling the flow of said drying gas through said drying zone relative to the rate of evolution of combustible vapors so as to maintain a relatively high concentration of vapor in said drying zone, while limiting the addition of oxygen to the system such that the substantially vapor-free gas from the catalytic oxidation zone is so deficient in oxygen that the gas-vapor mixture formed therewith in said drying zone always remains outside the limits of flammability under operating conditions irrespective of the vapor concentration in said mixture.

6. A method for drying articles which give off substantial quantities of combustible vapors during the drying operation, said method involving the use of a substantially inert drying gas which is continuously generated by the oxidation of vapors evolved in the course of the drying operation, and comprising the steps of passing a heated drying gas through a drying zone in contact with the articles to be dried, withdrawing the drying gas containing evolved combustible vapors from said drying zone, adding an oxygen-containing gas to said mixture of drying gas and combustible vapors in an amount at least sufficient to provide the stoichiometric quantity of oxygen required for complete oxidation of said vapors, passing the resultant mixture to a catalytic oxidation zone and therein contacting said mixture with an oxidation catalyst to effect substantially complete oxidation of said vapors, recycling one portion of the heated, substantially vapor-free gas leaving said catalytic oxidation zone to said drying zone as drying gas, controlling the flow of said drying gas through said drying zone relative to the rate of evolution of combustible vapors so as to maintain a relatively high concentration of vapor in said drying zone, while limiting the overall addition of oxygen-containing gas to the system such that the substantially vapor-free gas from the catalytic oxidation zone is so deficient in oxygen that the gas-vapor mixture formed therewith in said drying zone always remains outside the limits of flammability under operating conditions irrespective of the vapor concentration in said mixture, and mixing another portion of the substantially vapor-free gas leaving said catalytic oxidation zone with the gas-vapor mixture withdrawn from said drying zone prior to passage thereof to said catalytic oxidation zone.

7. A method in accordance with claim 6 in which the substantially vapor-free gas which is mixed with the gas-vapor mixture withdrawn from the drying zone prior to passage thereof to said catalytic oxidation zone is subjected to cooling before said mixing takes place.

References Cited in the file of this patent

UNITED STATES PATENTS

| | | |
|---|---|---|
| 1,371,914 | Lewis et al. | Mar. 15, 1921 |
| 1,603,760 | Furkert | Oct. 19, 1926 |
| 1,629,116 | Muehlenbeck | May 17, 1927 |
| 1,903,803 | Barker | Apr. 18, 1933 |
| 2,038,567 | Ittner | Apr. 28, 1936 |
| 2,658,742 | Suter et al. | Nov. 10, 1953 |